United States Patent [19]
Shimbo et al.

[11] Patent Number: 5,606,255
[45] Date of Patent: Feb. 25, 1997

[54] HALL EFFECT SENSING APPARATUS FOR MOVING OBJECT HAVING AN ADJUSTABLE MAGNETOR YOKE

[75] Inventors: Nobuyuki Shimbo; Junichi Ishiwata; Takatoshi Oyama; Fumio Ono; Michio Ishikawa, all of Tokyo, Japan

[73] Assignee: TDK Corporation, Tokyo, Japan

[21] Appl. No.: 28,965

[22] Filed: Mar. 10, 1993

[30]   Foreign Application Priority Data

Mar. 13, 1992 [JP] Japan .................................. 4-055358
Aug. 25, 1992 [JP] Japan .................................. 4-225569
Feb. 26, 1993 [JP] Japan .................................. 5-037183

[51] Int. Cl.$^6$ ............................. G01B 7/14; G01R 33/06; G01D 5/245
[52] U.S. Cl. ................................... 324/207.2; 324/207.12
[58] Field of Search ............................. 324/202, 207.12, 324/207.2, 207.21, 207.24, 207.25, 207.26, 225, 235, 207.13

[56]              References Cited

U.S. PATENT DOCUMENTS

| 3,252,057 | 5/1966 | Hoeppci | 324/207.26 |
|---|---|---|---|
| 4,518,918 | 5/1985 | Avery | 324/207.2 |
| 4,829,248 | 5/1989 | Loubier | 324/202 |
| 4,935,698 | 6/1990 | Kawaji et al. | 324/207.2 |
| 5,045,920 | 9/1991 | Vig et al. | 324/207.2 |

FOREIGN PATENT DOCUMENTS

| 0363512 | 4/1990 | European Pat. Off. . |
|---|---|---|
| 3333497 | 4/1985 | Germany . |
| 61-129543 | 6/1986 | Japan . |
| 2-264817 | 10/1990 | Japan . |
| 2191632 | 12/1987 | United Kingdom . |
| WO8910540 | 11/1989 | WIPO . |

*Primary Examiner*—Walter E. Snow
*Attorney, Agent, or Firm*—Knobbe, Martens, Olson & Bear

[57]              ABSTRACT

A Hall effect sensing apparatus for a moving object includes a moving magnetic member having concave and convex segments alternately at is periphery, a detector including a pair of Hall effect elements for converting a magnetic signal to an electric signal, a processing circuit for processing signals from the detector, a magnet for providing magnetic field to the Hall effect elements, and a yoke provided in close proximity to the magnet. The yoke has a smaller surface area than that of the magnet and is movably arranged so as to adjust detecting sensitivity of the sensing apparatus. Therefore, even though there are some variances of magnetic characteristics in the detector, the detecting sensitivity of the sensing apparatus can be adjusted to an optimum level by observing a signal outputted from the processing circuit.

10 Claims, 14 Drawing Sheets

HALL EFFECT SENSING APPARATUS FOR MOVING OBJECT HAVING AN ADJUSTABLE MAGNETOR YOKE

BACKGROUND OF THE INVENTION

1. Field of the Invention

The present invention relates to a hall effect-sensing apparatus for moving object enabling to detect moving status of a moving object such as a rack in a rack and pinion mechanism, a gear, or a multipolar magnet which moves straightforwardly or rotationally.

2. Description of the Prior Art

It has been conventionally known of a moving object detecting apparatus which has a structure as in FIG. 18. This apparatus can detect a moving status such as a moving distance or moving speed of a moving object which moves straightforwardly or rotationally. (Japanese Patent Laying-Open No. 2-264817)

The moving object detecting apparatus shown in FIG. 18 is comprised of: a cylindrical case 31, a lid 32 having a flat top surface 32a which is positioned on the top of the case 31, a detecting means 40 employing a detecting element 33 which is fixed inside the top surface 32a, and a filler 39 supporting the detecting means 40 in the case 31.

The detecting element 33 includes a pair of magnetic/electric conversion elements such as Hall elements 33a and 33b in keeping a distance L. In the detecting means 40, the detecting element 33, a magnet 35 providing a magnetic field to the Hall elements 33a and 33b, and a yoke 36 making a magnetic circuit which is positioned beneath the magnet 35 are assembled such as forming a layer.

This yoke 36 is used in order to increase magnetic coupling between the Hall elements 33a and 33b and the magnet 35 and, as a result, to heighten the detecting sensitivity of the detecting element 33.

There are three leads 33A, 33B, and 33C which are connected to the detecting means 40. Each of the leads 33A, 33B, and 33C is connected to an outside test device 41 through a cable 37.

An operation of the detecting means 40 is described in the following. Flux densities $B_a$ and $B_b$ are applied to the pair of the Hall elements 33a and 33b which are mounted on the detecting element 33 by the magnetic field of the magnet 35. Each Hall element 33a and 33b outputs voltage depending on the flux densities $B_a$ and $B_b$. The voltage outputted from the Hall elements 33a and 33b is processed in a processing circuit 33c which is assembled in the detecting element 33 and outputted as a detecting signal. Namely, by means of the processing circuit 33c assembled in the detecting element 33, when a difference of the flux density $\Delta B$ $(=\Delta B_a - \Delta B_b)$ between the pair of the Hall elements 33a and 33b becomes larger than a certain upper threshold $(\Delta B_1)$, the output level of the detecting signal goes down to L-level as shown in FIG. 19. Further, when a difference of the flux density $\Delta B$ becomes smaller than a certain lower threshold $(\Delta B_2)$, the output level of the detecting signal goes up to H-level. Thus, the magnetic characteristic of the detecting element 33 is determined by these threshold values in the upper threshold $(\Delta B_1)$ and the lower threshold $(\Delta B_2)$. The difference of the flux density $\Delta B$ is caused by a variation of the flux densities $B_a$ and $B_b$ which are applied to the Hall elements 33a and 33b by irregularity of teeth 38a of a magnetic moving object 38 which is positioned near the detecting means 40.

The above moving object detecting apparatus can detect a moving distance and speed of the moving object 38 by the test device 41 by positioning the teeth 38a of the moving object 38 near the top surface 32a, and by moving the moving object 38 in a X-direction so that the detecting means 40 generates the signal depending on the irregularity of the teeth 38a. Namely, when the moving object 38 moves to the X-direction, the output power from the Hall element 33a and 33b is processed by the detecting means 40, and a pulse signal as in FIG. 19 is generated from the detecting means 40 as the detecting signal. Thus, the moving distance and the speed of the moving object 38 can be obtained by counting a number of pulse per unit time of the detecting signal which can be obtained from the detecting means 40.

In the conventional moving object detecting apparatus; however, the detecting sensitivity is lowered due to variance in the magnetic characteristic of the detecting element 33 and the magnet 35 composing the detecting means 40.

Namely, the Hall elements 33a and 33b, which are positioned inside the detecting element 33 as the pair of magnetic/electric conversion elements, are formed on a substrate by a film of various semiconductor materials. However, the Hall elements 33a and 33b sometimes are not formed on the substrate to match their magnetic characteristics. In addition, the processing circuit 33c which processes the output power from the Hall elements 33a and 33b is also subjected to a dispersion to the magnetic characteristics due to the dispersion of values in circuit components. As a result, when the magnetic characteristic of the detecting element 33 fluctuates, that is, when the upper threshold $\Delta B_1'$ and the lower threshold $\Delta B_2'$ are shifted to the upper direction as shown in FIG. 20, the pulse as shown in FIG. 19 is no longer generated from the detecting means 40, and thus the detecting sensitivity is lowered.

Even if the upper threshold $\Delta B_1$ and the lower threshold $\Delta B_2$ do not fluctuate, the magnetic field of the magnet 35 is sometimes unstable. This causes an unbalance in the flux densities $B_a$ and $B_b$ which are applied to the pair of the Hall elements 33a and 33b. When, for example, the difference of the flux density $\Delta B'$ is fluctuated to the lower direction as shown in FIG. 21, the pulse shown in FIG. 19 cannot be outputted and the detecting sensitivity is accordingly lowered.

This unbalanced flux densities $B_a$ and $B_b$ are equally caused by an irregular position of the Hall elements 33a and 33b inside the detecting element 33 or an irregular mounting position of the detecting element 33 against the magnet 35.

In addition, in the conventional moving object detecting apparatus, since there is a problem that components such as detecting element 33, the magnet 35, and the yoke 36 tend to fall from the apparatus in an assembling process, the assembling efficiency as well as the detecting sensitivity will decrease.

OBJECTS AND SUMMARY OF THE INVENTION

The present invention is objected to solve the above-mentioned problems and to provide a moving object detecting apparatus which can adjust a detecting element to obtain the maximum detecting sensitivity and to prevent a fluctuation of the detecting sensitivity.

In order to accomplish the above object, the present invention is characterized in that: a detecting means having a detecting element including a magnetic/electric conversion element and a magnet which provides a magnetic field to the magnetic/electric conversion element, wherein at least either one of the detecting element or the magnet is movably provided so that the detecting sensitivity can be adjusted thereby. In addition, the detecting means provides a yoke, wherein at least either one of the detecting element, the magnet, or the yoke is movably provided so that the detecting sensitivity can be adjusted thereby.

By means of the invention having the above structure, it is possible to adjust the detecting sensitivity of the detecting element even there exists variance in magnetic characteristics in detecting means by moving at least either one of the detecting element, the magnet, or the yoke.

Furthermore, in order to accomplish the above object, the present invention is characterized to have the movable detecting element, a spacer which fixedly supports the magnet and the yoke, a holder which movably holds the spacer from the side, and an anti-falling means which prevents the spacer from falling from the apparatus.

By means of the present invention having the above structure, the assembling efficiency can be improved by preventing the spacer from falling, that is, as a result, preventing the detecting means which comprises the detecting element, the magnet and the yoke from falling from the apparatus. The present invention not only can prevent the detecting means from falling, but also can adjust the detecting sensitivity by moving at least either one of the detecting element, the magnet or the yoke, even if there are some dispersion in the magnetic characteristics. Therefore, the fluctuation of the detecting sensitivity can be eliminated.

DESCRIPTION OF THE PREFERRED EMBODIMENTS

The preferred embodiments of the present invention are described in the following in reference to the drawings.

Figure 1:
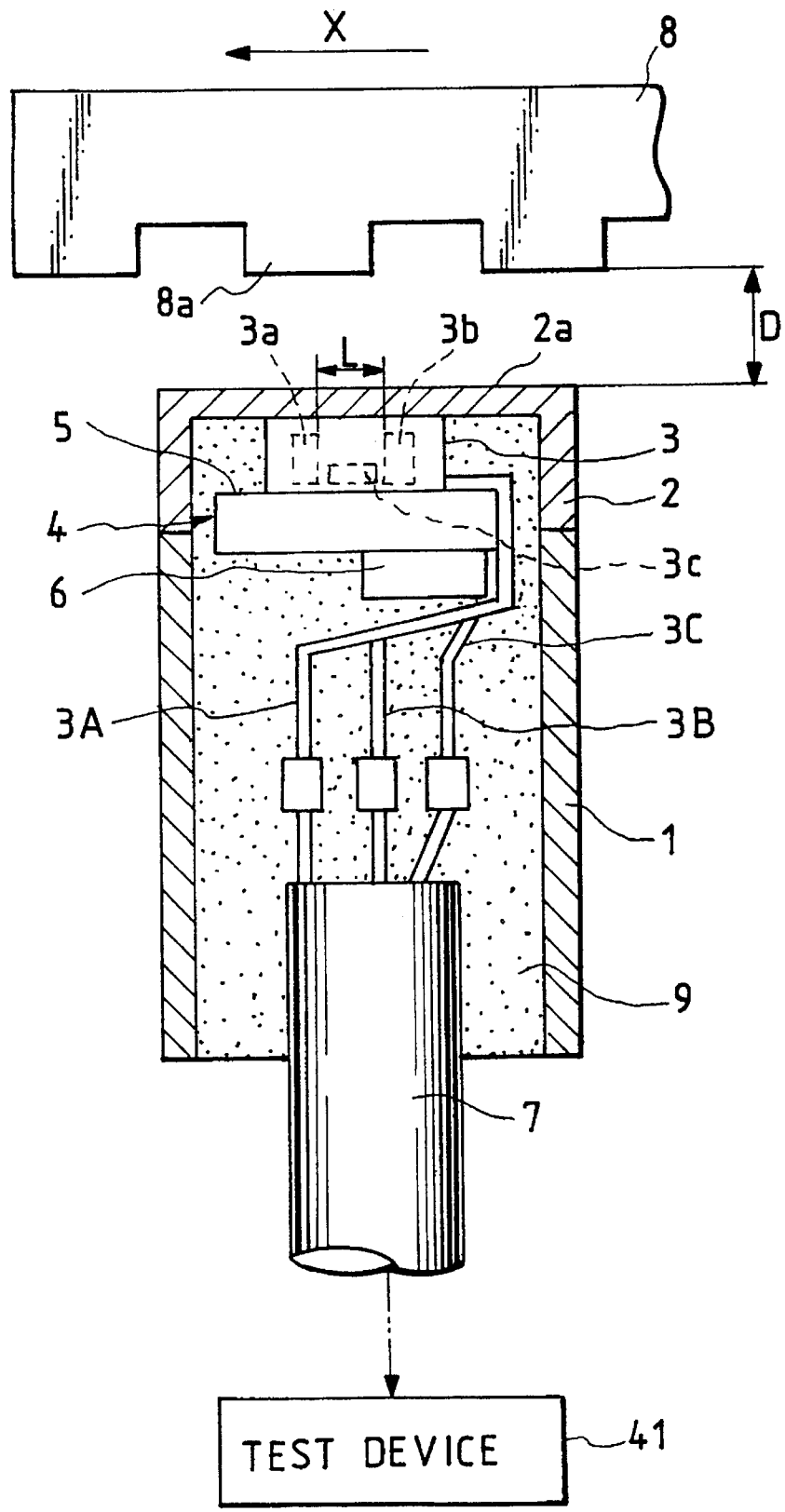
FIG. 1 is a cross sectional view showing the first embodiment of the moving object detecting apparatus of the present invention.

As shown in FIG. 1, the first preferred embodiment of the moving object detecting apparatus of the present invention is comprised of: a cylindrical case 1, a lid 2 having a flat top which is positioned on the top of the case 1, a detecting element 3 which is mounted in the inside of a top surface 2a of the lid 2 wherein a pair of Hall elements 3a and 3b are provided as magnetic/electric conversion elements in keeping a distance L, a magnet 5 which is positioned beneath the detecting element 3 and provides magnetic field for the pair of the Hall elements 3a and 3b, and a yoke 6 which is positioned beneath the magnet 5 for adjusting the magnetic field. The detecting element 3, the magnet 5 and the yoke 6 are assembled so as to form a detecting means 4. Further, a process circuit 3c is assembled in the detecting element 3 so that the output power of the Hall elements 3a and 3b is processed to output a detecting signal.

The yoke 6 is located beneath the magnet 5 so that the detecting sensitivity of the detecting element 3 is increased to a maximum. The fixing position of the yoke 6 can be arranged depending on the magnetic characteristic of the detecting element 3 as described in the following. Further, the yoke 6 is fixed and supported by a filler 9 inside the case 1 after being located beneath the magnet 5 at a desirable position.

Reference numerals 3A, 3B and 3C are leads which are connected to the detecting means 4. Each of the leads 3A, 3B and 3C is connected to an external test device 41 through a cable 7.

Next, a method for positioning the yoke 6 beneath the magnet 5 in this preferred embodiment is described in the following.

Figure 2:
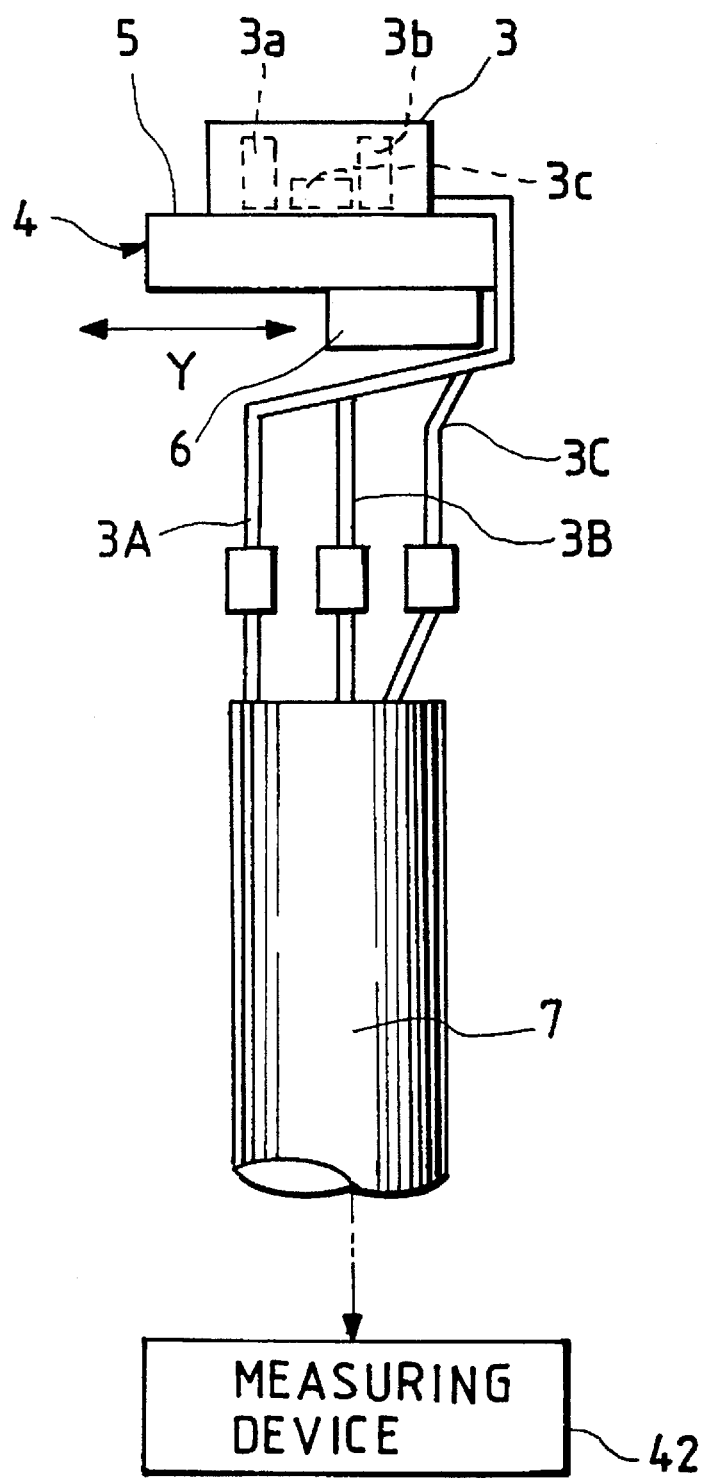
FIG. 2 is a schematic diagram illustrating a fixing method of the yoke to the magnet in the first embodiment.

As shown in FIG. 2, the detecting element 3 including the pair of the Hall elements 3a and 3b is fixed above the magnet 5 causing the dispersion in the magnetic characteristic of the detecting means 4. Next, the yoke 6 is fixed beneath the magnet 5, wherein the yoke 6 is partially movable. The present apparatus in this preferred embodiment is maintained in a close range of a moving area of a moving object. The cable 7 extending from the detecting means 4 is connected to a measuring device 42 such as an oscilloscope. While the detecting signal outputted from the detecting means through each lead 3A, 3B, 3C and the cable 7 is displayed in a monitor screen of the measuring device 42, the yoke 6 is moved to a Y-direction beneath the magnet 5, and a changing status of the detecting signal is therefore observed.

Figure 3:
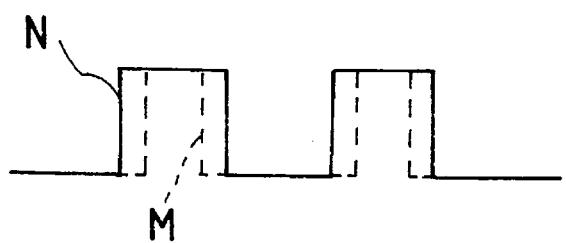
FIG. 3 is a waveform diagram showing a detecting signal describing the fixing method of the yoke to the magnet in the first embodiment.

For example, when the yoke 6 is positioned in a certain place, the detecting signal is displayed on the monitor screen of the measuring device 42 as shown in a broken line M in FIG. 3. In this situation, when the detecting signal indicates the maximum detecting sensitivity of the detecting element 3 as shown in a solid line N in FIG. 3, the position of the yoke 6 relative to the magnet 5 is determined therein by moving the yoke 6 in the left/right directions. Consequently, the detecting means 4 including the yoke 6 is fixed and supported by the filler 9 inside the case 1 while maintaining the position determined by the above method.

By means of the preferred embodiment, the yoke 6 movably provided beneath the magnet 5 can be fixed in a position where the detecting sensitivity of the detecting element 3 becomes maximum depending on the dispersion in the magnetic characteristic of the detecting means 4, while observing the detecting signal which is outputted from the detecting means 4. Thus, even though there are some dispersion in the magnetic characteristic of the detecting means 4, it is possible to make the detecting sensitivity of the detecting element 3 to the maximum level by simply moving the yoke 6.

Figure 4A:
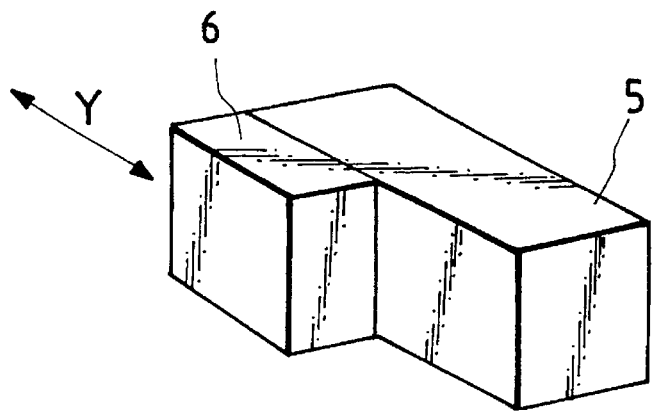
FIG. 4A is a perspective view showing an example of combination of shapes of the magnet and the yoke in the first embodiment.
Figure 4B:
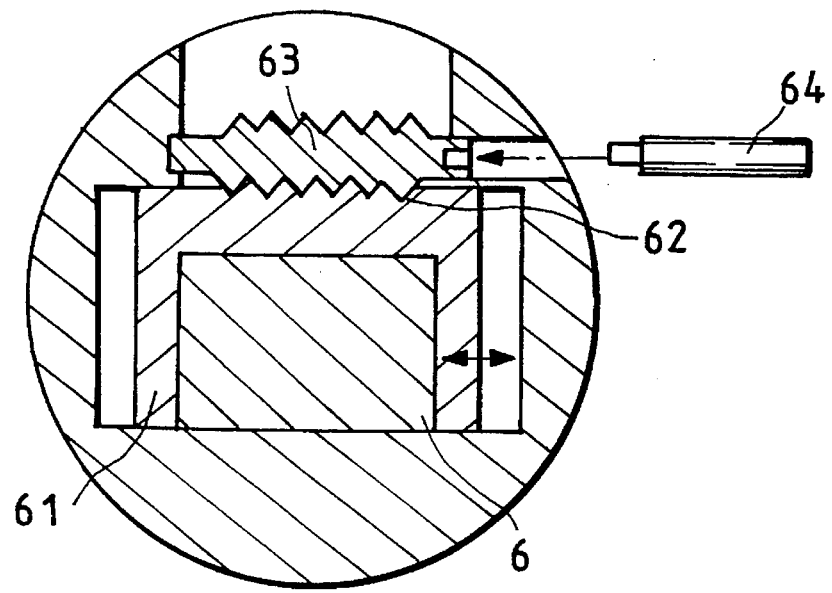
FIG. 4B is a cross sectional view showing the main part of FIG. 4A.
Figure 5A:
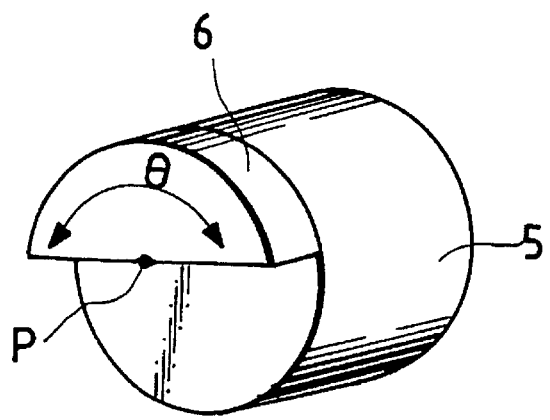
FIG. 5A is a perspective view showing an example of combination of shapes of the magnet and the yoke in the first embodiment.
Figure 5B:
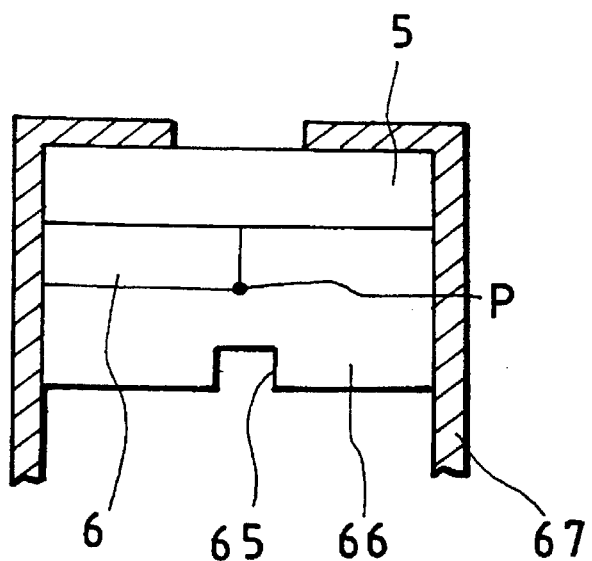
FIG. 5B is a cross sectional view showing the main part of FIG. 5A.

FIGS. 4 and 5 show examples of shapes of the yoke 6 depending on the shape of the magnet 5.

FIG. 4A shows an example that the magnet 5 has a prism-shape and the yoke 6 has a semi-prism shape. The yoke 6 slides on the surface of the magnet 5 to an A-direction so as to determine the most suitable position. Namely, as shown in FIG. 4B, the yoke 6 can be moved to Y-direction by providing a rack groove 62 in a holder 61 which supports the yoke 6 so that a screw 63 can be rotated by a tool 64. FIG. 5A shows another example that the magnet 5 has a circular shape and the yoke 6 has a semi-circular shape accordingly. The yoke 6 rotatably slides on the surface of the magnet 5 around a P-point as a support point so as to determine the most suitable position. Namely, the yoke 6 can be moved to θ-direction by holding the yoke 6 by a spacer 66 having a groove 65 so that the magnet 5, the yoke 6 and the spacer 66 can be stored in a holder 67. Other combinations of the shape are also applicable for the magnet 5 and the yoke 6, and the same effect can be obtained as well.

Figure 7:
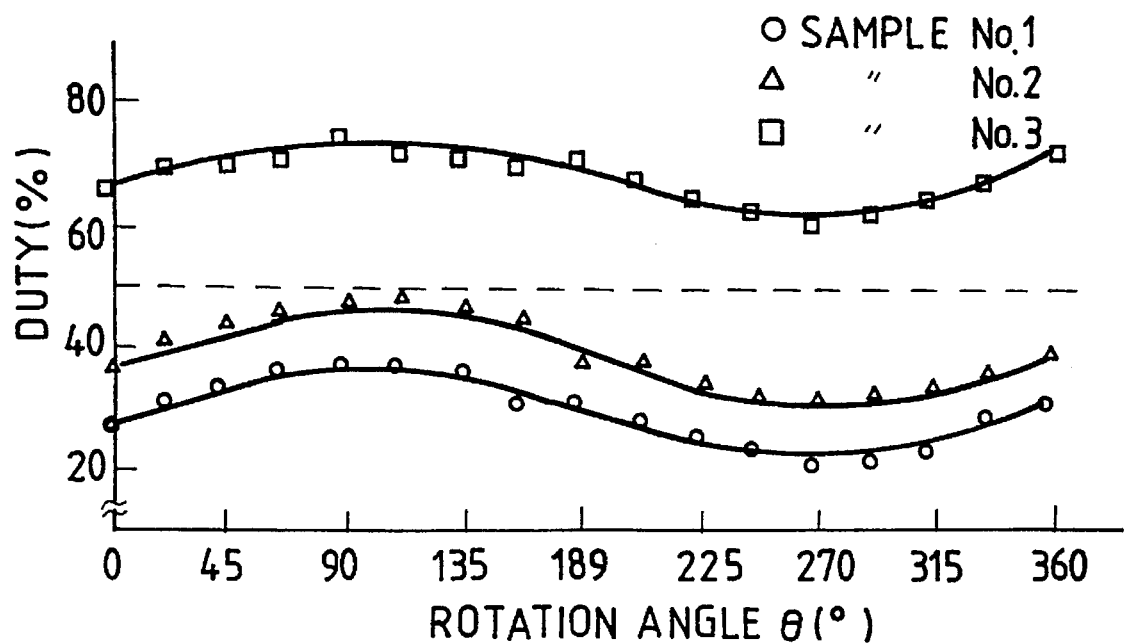
FIG. 7 is a diagram showing a relationship between a rotation angle which is obtained by the first embodiment and a duty ratio.
Figure 8:
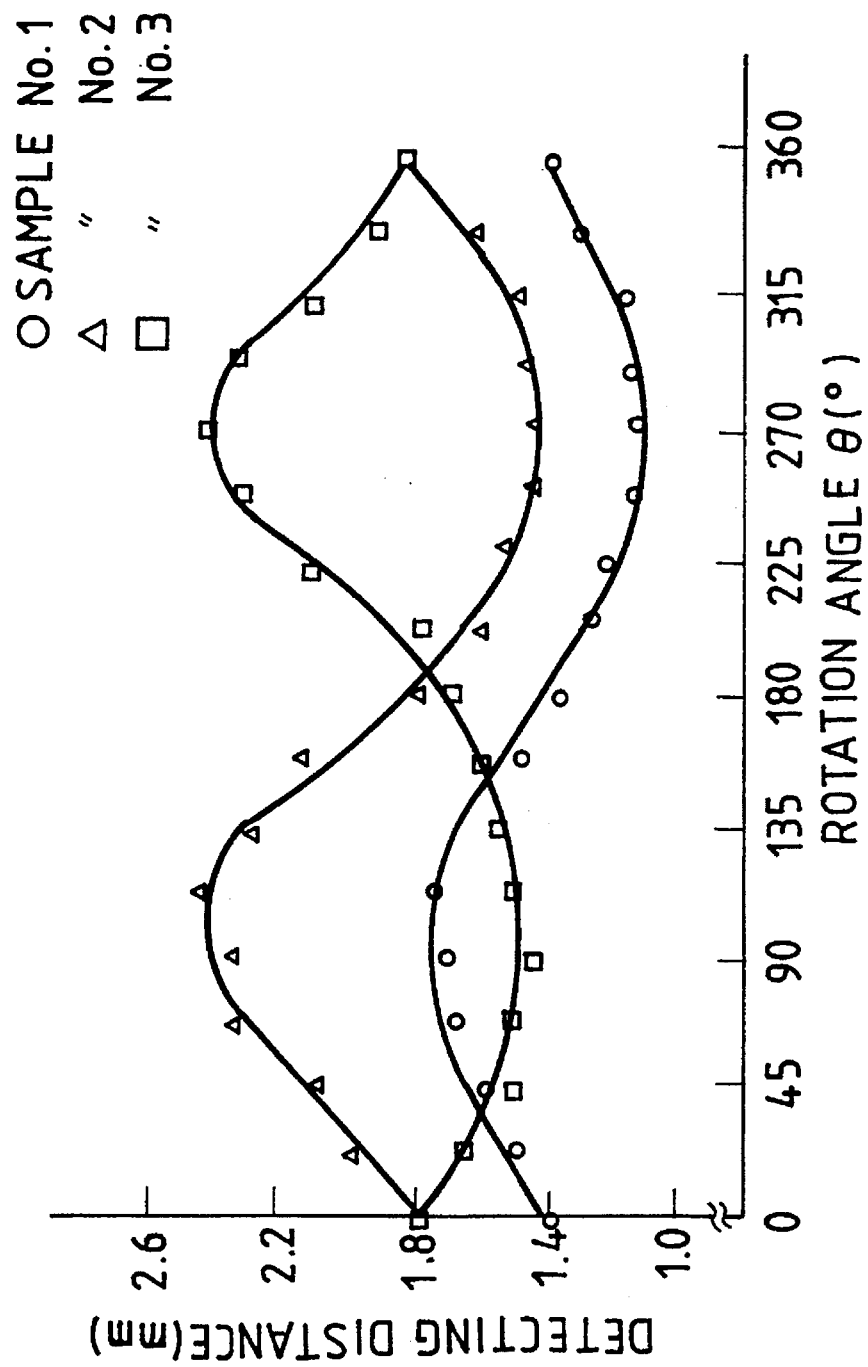
FIG. 8 is a diagram showing a relationship between a rotation angle which is obtained by the first embodiment and a detecting distance.

FIG. 7 is a diagram showing a relationship between a rotation angle θ and a duty ratio when the semi-circular yoke 6 is rotatably slid as in FIG. 5. FIG. 8 is a diagram showing a relationship between a rotation angle θ and a detecting distance D. The "detecting distance" is herein defined as a maximum detectable distance between an edge of teeth 8a of a moving object 8 and the top surface 2a of the lid 2 of the moving object detecting apparatus which is shown as D in FIG. 1, that is, the maximum detectable distance showing a limit where the output power of the pulse can be obtained from the detecting element 3. In addition, in FIGS. 7–8 and Table 1, Sample Nos. indicate a serial numbers of the detecting elements 3 which are used in the test.

As shown in FIGS. 7 and 8, the detecting distance D becomes maximum when the duty ratio is almost 50%.

While the yoke 6 is rotatably slid and the detecting signal is observed in the monitor screen of the measuring device 42, if the yoke 6 is fixed where the duty ratio almost becomes 50%, that is, at the position where the detecting signal indicates the maximum detecting sensitivity of the detecting element 3, it is possible to easily adjust the detecting sensitivity to the maximum level. By utilizing this effect, the duty ratio can be set in a predetermined range.

Table 1 shows the measured result of the detecting distance D (mn): 1) when the maximum detecting sensitivity is obtained by the semi-circular yoke, and 2) when a full-circular yoke (not shown in the drawing) is used and the detecting sensitivity is not adjusted to obtain the maximum level.

TABLE 1

| Samples Nos. | Detecting Distance D (mm) | | |
| --- | --- | --- | --- |
| | 1 | 2 | 3 |
| Semi-Circular Yoke | 1.75 | 2.45 | 2.45 |
| Full-Circular Yoke | 1.50 | 1.65 | 1.85 |

Table 1 clearly indicates that the full-circular yoke does not necessarily obtain the maximum detecting sensitivity; thus, the detecting distance D is smaller than that of the semi-circular yoke 6.

Figure 6:
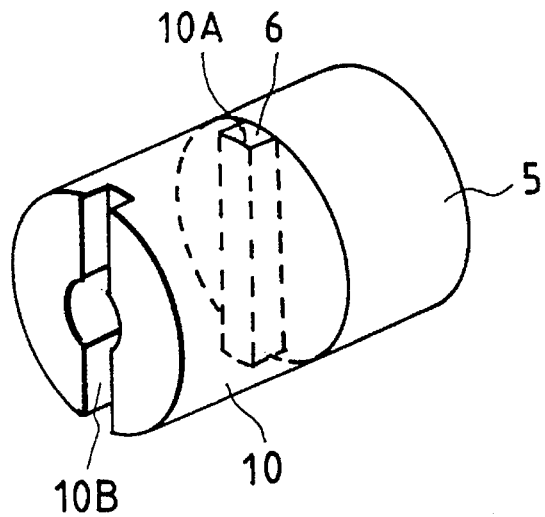
FIG. 6 is a schematic diagram showing another embodiment of the first embodiment.

FIG. 6 shows another preferred embodiment of the present invention. A semi-prism-shaped yoke 6 is mounted on the circular-shaped magnet 5 (the yoke 6 should be preferably eccentrically positioned in one side for convenience of the adjustment). A spacer 10 has a groove 10A for an insertion on one end and a groove 10B for adjusting a rotation on the other end. By using this spacer 10, the yoke 6 is adapted to be inserted into the groove 10A. By means of the spacer 10, it is easy to adjust the rotation angle of the yoke 6 by using an ordinary tool such as a screwdriver.

Figure 9:
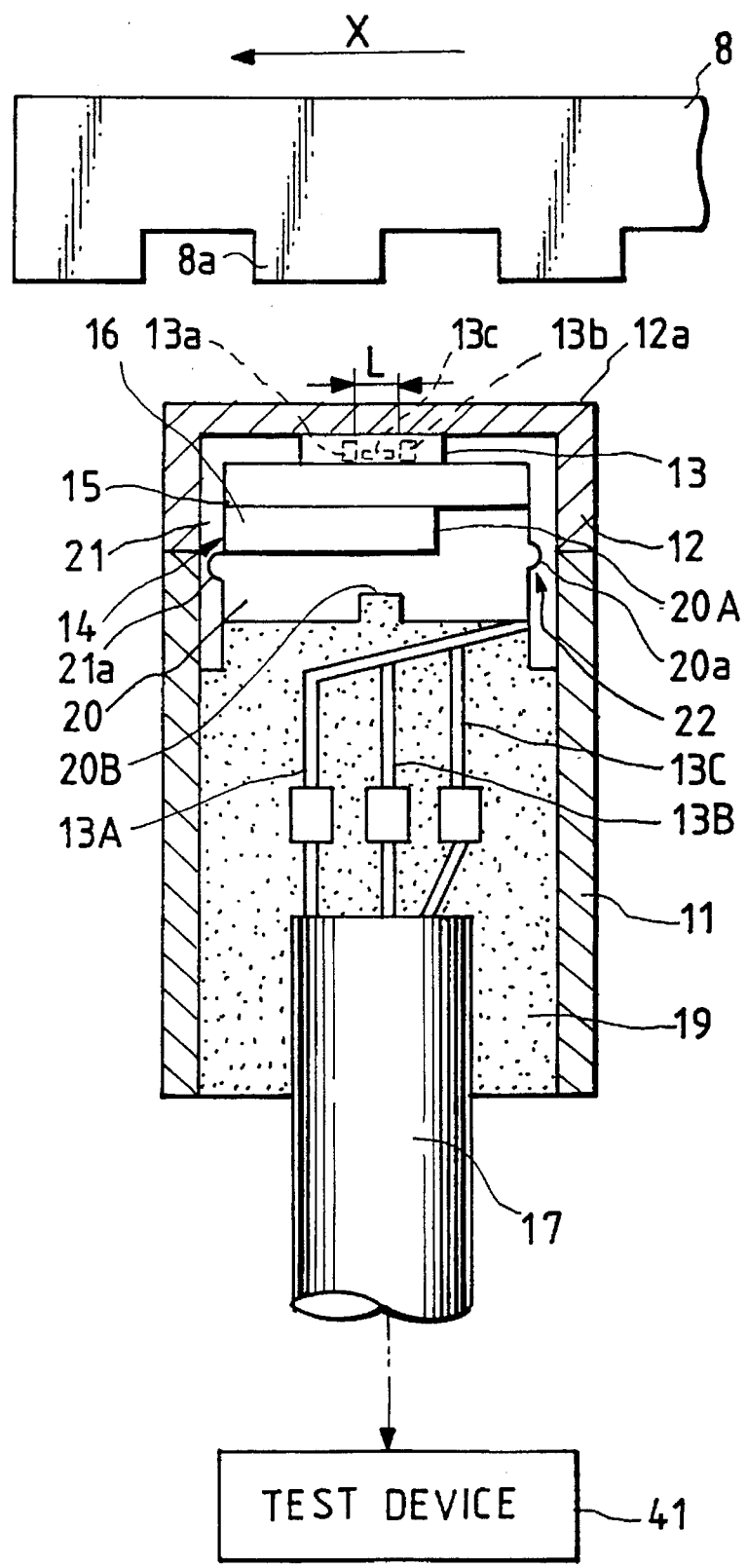
FIG. 9 is a cross sectional view showing the second embodiment of the moving object detecting apparatus of the present invention.

As shown in FIG. 9, the second preferred embodiment of the present invention comprises: a cylindrical case 11 which is made of metal such as aluminum, a lid 12 having a flat top which is positioned on the top of the case 11, a detecting element 13 which is mounted in the inside of a top surface 12a of the lid 12 wherein a pair of the Hall elements 13a and 13b are provided as magnetic/electric conversion elements in keeping a distance L, a magnet 15 providing magnetic field for the pair of the Hall elements 13a and 13b, and a yoke 16 which is positioned beneath the magnet 15 for adjusting the magnetic field. The detecting element 13, the magnet 15 and the yoke 16 are assembled so as to compose the detecting means 14.

In addition, a process circuit 13c is assembled in the detecting element 13 so that the output power of the Hall elements 13a and 13b is processed to output the detecting signal. Reference numeral 20 is a spacer supporting the magnet 15 and the yoke 16 in the inside of a holder 21 which is described in the following. This spacer 10 also determines the position of the yoke 16 beneath the magnet 15 so that the detecting sensitivity of the detecting element 13 becomes maximum. The fixing position of the yoke 16 is adjustable depending on the magnetic characteristic of the detecting element 13 as described in the following. Further, after the yoke 16 is fixed in a predetermined position beneath the magnet 15, it is supported by a filler 19 in the inside of the case 11. Reference numeral 21 is a cylindrical holder which is made of resin and supports the magnet 15, yoke 16 and the spacer 20 from the side. This holder 21 is fixed inside the case 11 and the lid 12.

In both sides of the spacer 20, projections 20a are provided along the outer periphery. In the inner surface of the holder 21 corresponding to these projections 20a, concave portions 21a are provided along the inner periphery. By having the projections 20a and the concave portions 21a engage each other, an anti-falling means 22 is formed thereby. Thus, the magnet 15, the yoke 16 and the spacer 20 are prevented from falling from the apparatus. As a result, the detecting means 14 comprising the detecting element 13, the magnet 15 and the yoke 16 is prevented from the falling.

Figure 10:
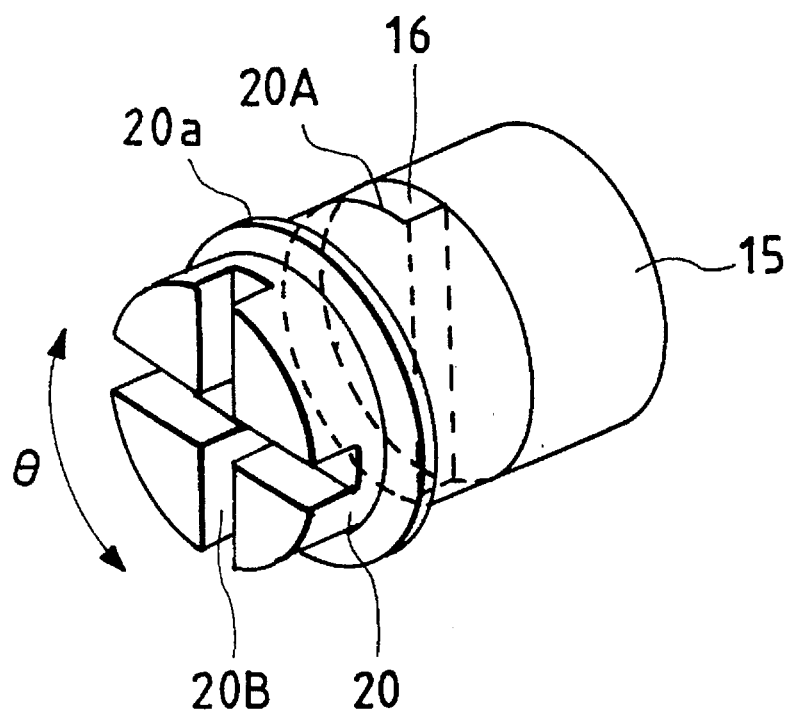
FIG. 10 is a perspective view showing a structure of the main part of the second embodiment.

FIG. 10 is a perspective view showing an arrangement of the magnet 15, the yoke 16 and the spacer 20. The semicircular yoke 16 is provided to the cylindrical magnet 15. The spacer 20 includes an insertion groove 20A which is provided on its one end and a groove for rotation 20B which is provided on the other end. The groove 20A is engaged with the yoke 16. By means of the above spacer 20, it is easy to adjust the rotation angle θ of the yoke 16 by using a screwdriver or the like in the groove 20B.

In FIG. 9, the lead 13A, 13B and 13C are connected to the detecting means 14. Each of the leads 13A, 13B and 13C is connected to the outer test device 41 through the cable 17.

In the second preferred embodiment, a method for assembling the magnet 15, the yoke 16 and the spacer 20 in the holder 21 is described. A method for positioning the yoke 16 beneath the magnet 15 in is also described therein.

In FIG. 9, the cylindrical holder 21 is fixed inside the case 11 and the lid 12. Inside this holder 21, first of all, the magnet 15, in which the detecting element 13 including the Hall elements 13a and 13b are mounted, is positioned. Then, the yoke 16 and the spacer 20 are positioned in order. Since the projections 20a of the spacer 20 are engaged with the concave portions 21a of the holder 21, the anti-falling means 22 which prevents the magnet 15, the yoke 16 and the spacer 20 from the falling is formed thereby. By means of this structure, the holder 21 can support the magnet 15, the yoke 16 and the spacer 20 from the side. Thus, the detecting means 14 comprising the magnet 15, the yoke 16 and the spacer 20 can be prevented from falling.

Furthermore, a positioning method for locating the yoke 16 at a desirable position beneath the magnet 15 is as follows. For example, let's assume that there are some dispersion in the magnetic characteristic of the Hall elements 13a and 13b which are mounted on the magnet 15. In this situation, the yoke 16 is fixed beneath the magnet 15, wherein the yoke 16 is partially rotatable as shown in FIG. 10. The present apparatus is maintained in a close range of a moving area of the moving object as same as in FIG. 2. The cable 17 extending from the detecting means 14 is connected to the measuring device 42. The detecting signal which is outputted from the detecting means 14 through the leads 13A, 13B, 13C and the cable 17 is displayed in the monitor screen of the measuring device 42. The changing status of the detecting signal is therein observed by rotating the yoke 16 to a θ-direction beneath the magnet 15 with a screwdriver or the like in the groove 20B of the spacer 20.

When the yoke 16 is positioned in a certain place, the detecting signal is displayed on the monitor screen of the measuring device 42 as shown in a broken line M in FIG. 3. By moving the yoke 16 in the θ-direction, the position of the yoke 16 relative to the magnet 15 is determined when the detecting signal indicates the maximum detecting sensitivity of the detecting element 13, as shown in FIG. 3 in a slid line N. Consequently, the detecting means 14 including the yoke 16 is fixed by the filler 19 in the inside of the case 11 while maintaining the position determined by the above method.

Since the second preferred embodiment employs the anti-falling means 22, the magnet 15, the yoke 16 and the spacer 20 can be prevented from falling. As a result, the detecting means 14 comprising the magnet 15, the yoke 16 and the spacer 20 can be prevented from falling in the assembly process; thus, the assembling efficiency can be improved.

Furthermore, the yoke 16 is rotatably positioned beneath the magnet 15 in advance. While observing the detecting signal outputted from the detecting means 14 depending on the dispersion of the magnetic characteristic of the detecting means 14, the detecting means 14 is positioned where the detecting sensitivity of the detecting element 13 becomes maximum by rotating the yoke 16 with the spacer 20. Thus, the detecting sensitivity can be prevented from changing.

By means of the second preferred embodiment, the magnet 15, the yoke 16 and the spacer 20 are supported in the side by the holder 21 which is fixed inside the case 11 and the lid 12. Thus, the detecting means 14 is not only prevented from falling, but also prevented from sliding. Therefore, the assembly of the device can be performed securely.

Figure 11:
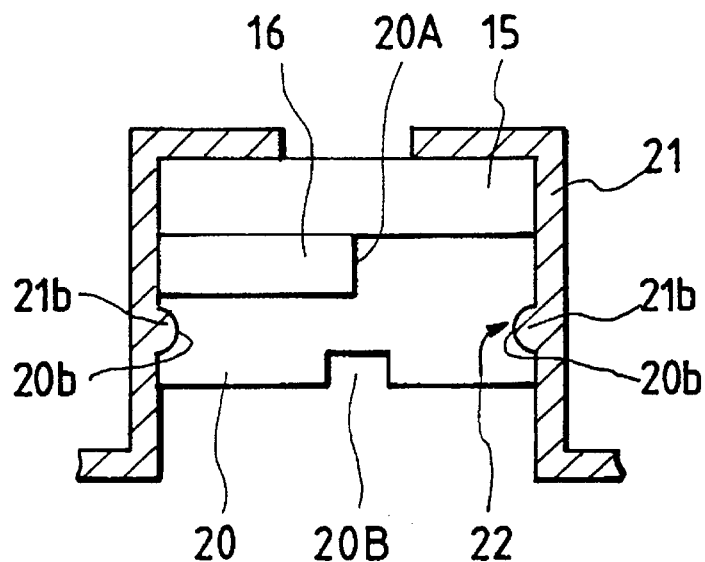
FIG. 11 is a cross sectional view showing another embodiment of the second embodiment.

FIG. 11 is a cross sectional view showing another preferred embodiment of the second embodiment. In the embodiment, the anti-falling means 22 is constructed by concave portions 20b which are provided in both sides of the spacer 20 and projections 21b which are provided inside the holder 21.

Figure 12:
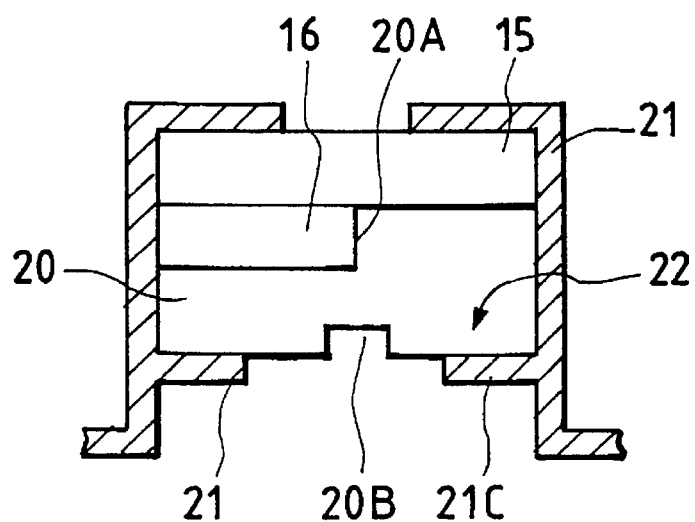
FIG. 12 is a cross sectional view of a further embodiment of the second embodiment.

FIG. 12 is a cross sectional view showing a further embodiment of the second preferred embodiment. In the embodiment, the anti-falling means 22 is constructed by a click 21c for supporting the spacer which is provided inside the holder 21.

In the embodiment shown in FIGS. 11 and 12, the anti-falling means 22 is also provided where the spacer 20 and the holder 21 contact each other. Thus, the same effect as the second preferred embodiment can be obtained.

In the second preferred embodiment and another embodiment of the second preferred embodiment, the moving object detecting apparatus having the detecting element 13 including a pair of magnetic/electric conversion elements is described as an example, wherein the yoke 16 is rotated by the spacer 20 so as to be positioned in a desirable place. However, other structures are also applicable. If the moving object detecting apparatus has the spacer 20 which supports the magnet 15 and the yoke 16, it only needs one magnetic/electric conversion element, and the spacer 20 is not necessarily rotated.

Figure 13:
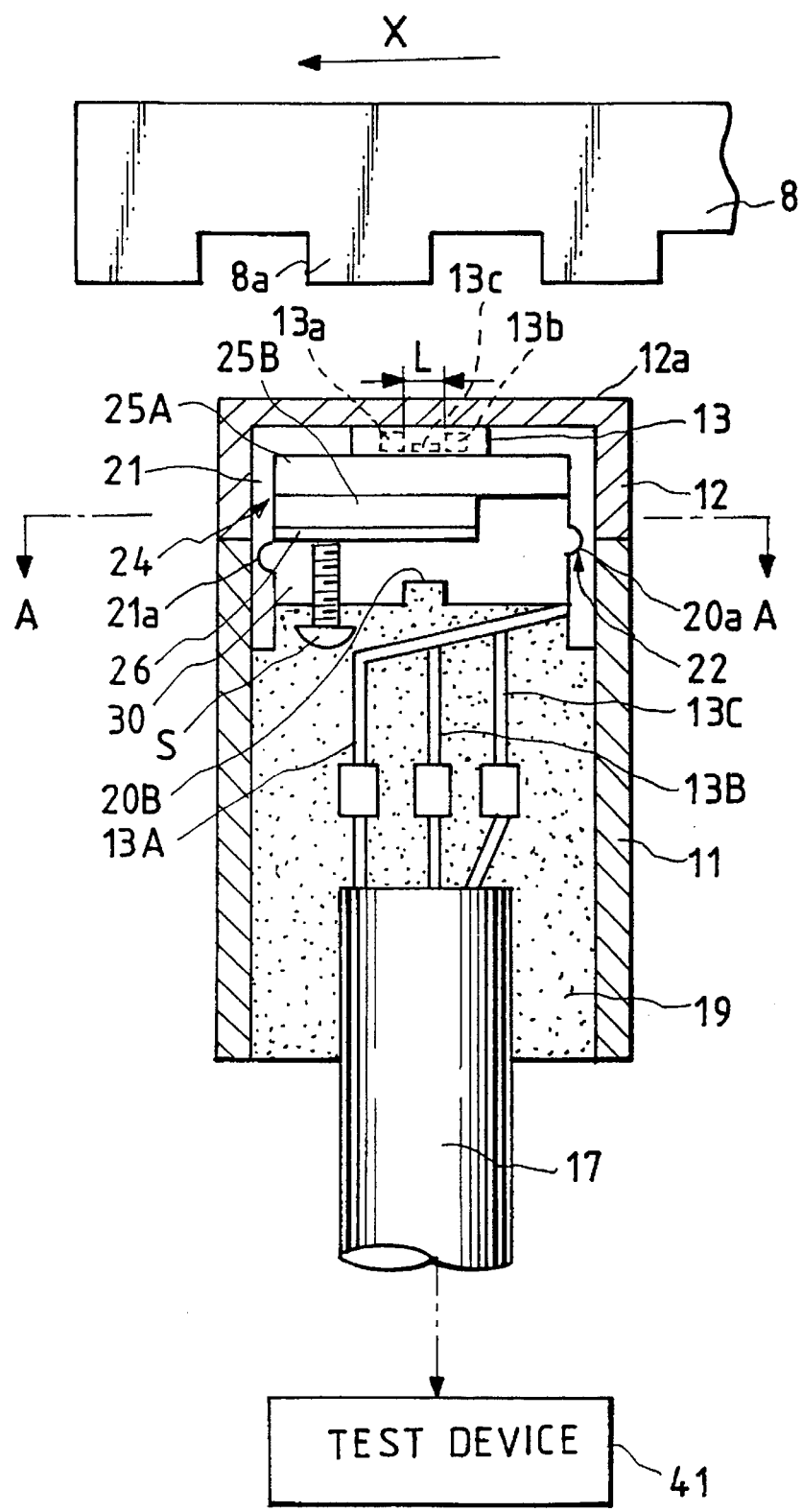
FIG. 13 is a cross sectional view of the third embodiment of the moving object detecting apparatus of the present invention.

As shown in FIG. 13., the third preferred embodiment of the present invention, as same as in the second preferred embodiment, comprises: a case 11, a detecting element 13 including the pair of the Hall elements 13a and 13b, a holder 21, a disc-like first magnet 25A positioned beneath the detecting element 13 and providing magnetic field for the Hall elements 13a and 13b, a smaller disc-like second magnet 25B positioned beneath the magnet 25A and adjusting the above magnetic field, a yoke 26 positioned beneath the second magnet 25B. The detecting element 13, the first magnet 25A, the second magnet 25B, and the yoke 26 are assembled so as to compose a detecting means 24.

Figure 14:
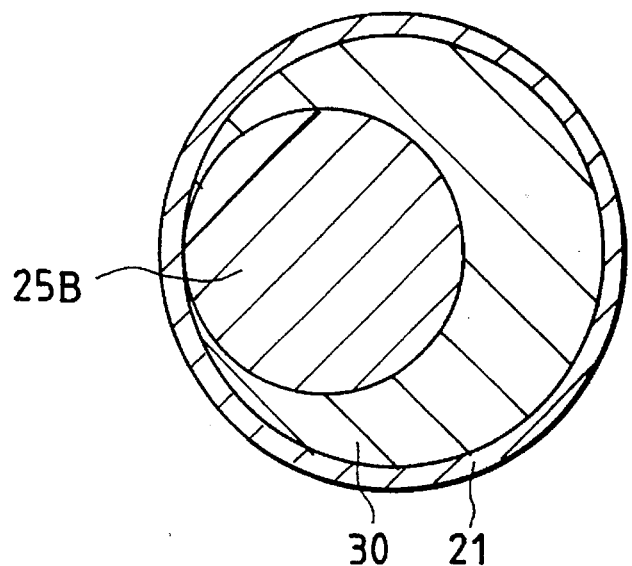
FIG. 14 is a cross sectional view which is taken along A—A line as shown in FIG. 13.

FIG. 14 is a cross sectional view which is cut away in A—A line as shown in FIG. 13.

Reference numeral 30 is a spacer which supports the first magnet 25A in the inside of the holder 21. The spacer 30 also supports the second magnet 25B and the yoke 26 on its one side in the inside of the holder 21 as shown in FIG. 14. The second magnet 25B is positioned beneath the first magnet 25A in a place where the detecting sensitivity of the detecting element 13 becomes maximum. The fixing position of the second magnet 25B is adjustable depending on the magnet characteristic of the detecting element 13. After being positioned beneath the first magnet 25A, the second magnet 25B is temporarily fixed by a screw S and supported by the filler 19 in the inside of the case 11.

The projections 20a are provided along the outer periphery in both sides of the spacer 30 as in the second preferred embodiment. When the projections 20a and the concave portions 21a of the holder 21 are engaged each other, the anti-falling means 22 is formed thereby. Thus, the first magnet 25A, the second magnet 25B, the yoke 26, and the spacer 30 are prevented from falling from the apparatus. As a result, the detecting means 24 comprising the detecting element 13, the first magnet 25A, the second magnet 25B, and the yoke 26 is prevented from the falling.

In the apparatus of the third preferred embodiment having the above structure, an assembling for the first magnet 25A, the second magnet 25B, the yoke 26, and the spacer 30 inside the holder 21 can be done as in the second preferred embodiment. In addition, a positioning of the second magnet 25B beneath the first magnet 25A at a desirable position can be done as in the second preferred embodiment by rotating a groove 20B which is provided in the spacer 30 by a screwdriver or the like and observing a change of the detecting sensitivity.

By means of the third preferred embodiment, the first magnet 25A, the second magnet 25B, the yoke 26, and the spacer 30 inside the holder 21 can be prevented from falling by the anti-falling means 22 as in the second preferred embodiment. Even though there are some variances in the magnetic characteristics in the detecting means 14, the detecting sensitivity of the detecting element 13 can be adjusted by moving the second magnet 25B as shown in the measured result of the detecting distance D (mn) in Table 2. Therefore, the detecting sensitivity can be prevented from changing.

TABLE 2

| Samples Nos. | 1 | 2 | 3 |
|---|---|---|---|
| Detecting Distance D (mm) | 2.50 | 2.65 | 2.55 |

In the third preferred embodiment, the apparatus utilizing the first magnet 25A and the second magnet 25B does not need the yoke 26 for a magnetic connection. Thus, the yoke 26 can be omitted in this case. In addition, the first and second magnets 25A and 25B can be prism shape.

Figure 15:
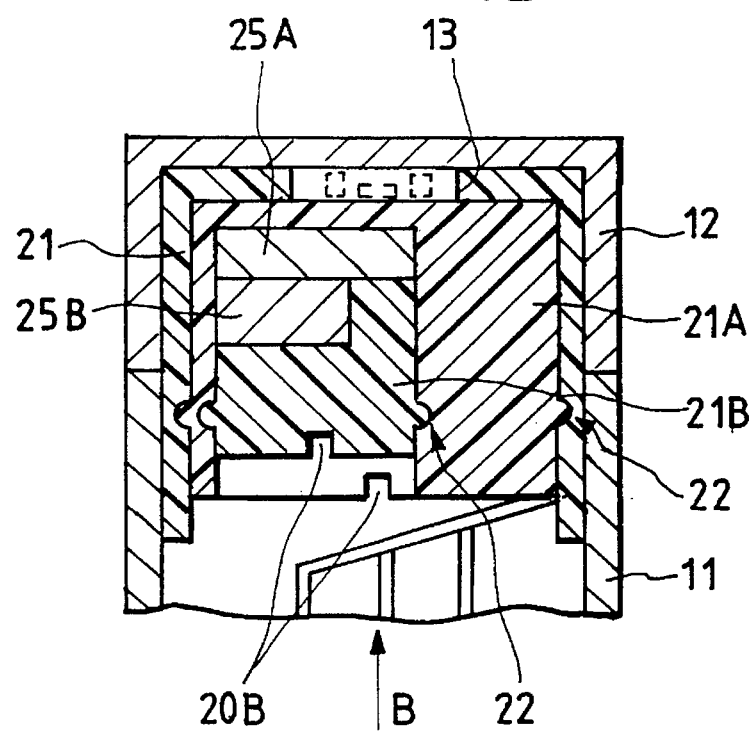
FIG. 15 is a cross sectional view showing a further embodiment of the third embodiment.
Figure 16:
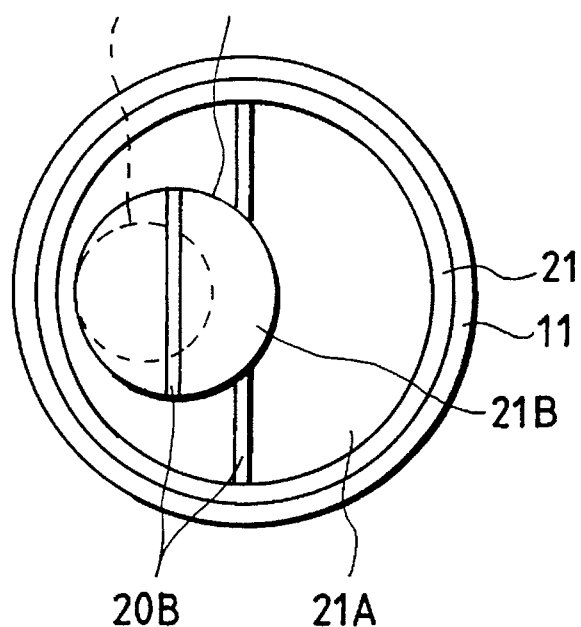
FIG. 16 is a fragmentary view taken in the direction of the arrow B of FIG. 15.

FIG. 15 is a cross sectional view showing a main part of the third preferred embodiment. FIG. 16 is a fragmentary view taken in the direction of the arrow B of FIG. 15.

In the third embodiment as shown in FIGS. 15 and 16 the first holder 21A is rotatably supported in the holder 21, and the second 21B is rotatably supported in the first holder 21A. The first magnet 25A is fixed in the inside of the first holder 21A. The second magnet 25B and the second holder 21B are accordingly provided beneath the first magnet 25A. The first and second magnets 25A and 25B are positioned at one side against the pair of the Hall elements 13a and 13b.

In the embodiment shown in FIGS. 15 and 16, the first magnet 21A and the second magnet 21B are moved together or separately by using a groove 20B provided in each of the first and second holders 21A and 21B so that more precise adjustment of the detecting sensitivity is enabled.

Figure 17:
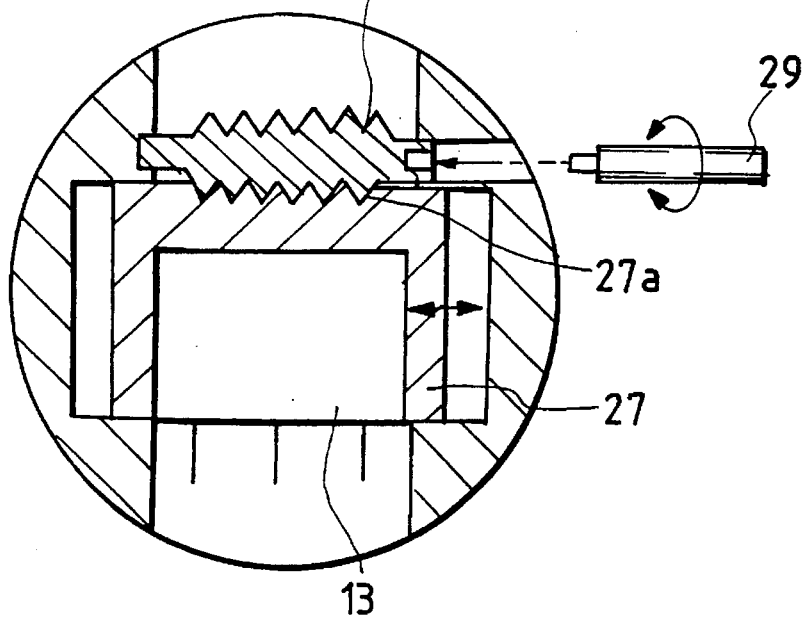
FIG. 17 is a cross sectional view showing the fourth embodiment of the moving object detecting apparatus of the present invention.
Figure 18:
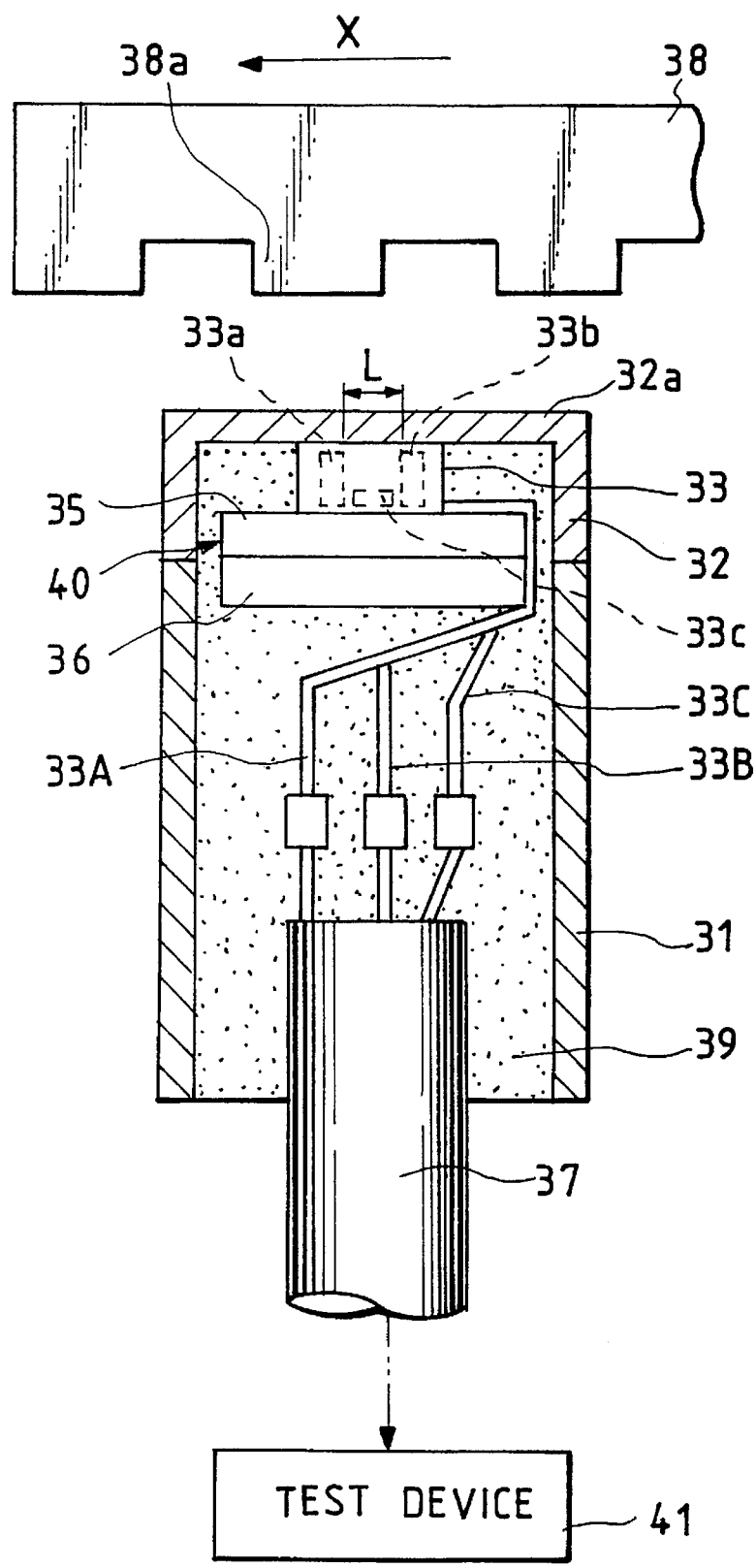
FIG. 18 is a cross sectional view showing a structure of a conventional embodiment.
Figure 19:
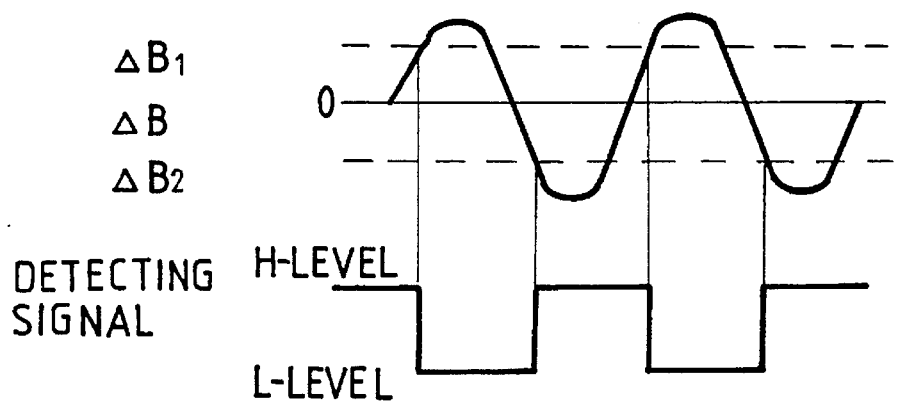
FIG. 19 is a diagram showing a relationship between a threshold value and a detecting signal.
Figure 20:
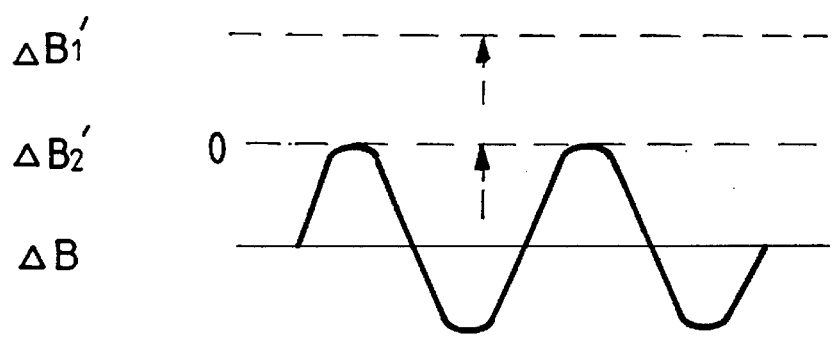
FIG. 20 is a diagram for explaining a disadvantage of the conventional embodiment.
Figure 21:
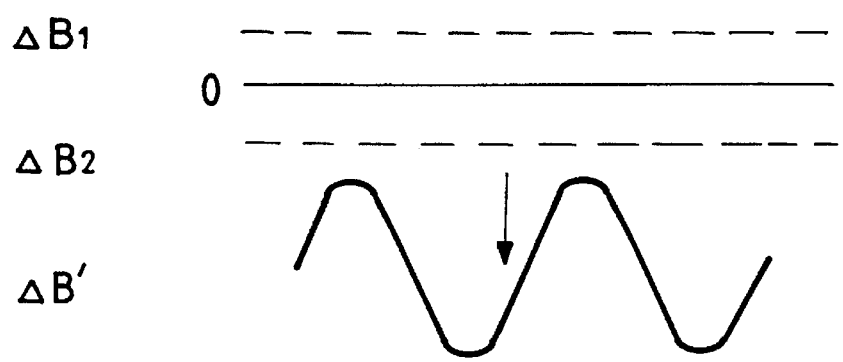
FIG. 21 is also a diagram for explaining a disadvantage of the conventional embodiment.

FIG. 17 is a cross sectional view showing the fourth preferred embodiment of the moving object detecting apparatus.

In FIG. 17, a rack groove 27a is provided in a holder 27 which supports the detecting element 13, wherein the detecting element 13 can be moved by rotating a screw 28 with a tool 29. Further, a magnet and a yoke can be positioned vertically. For a moving mechanism of the magnet element 13, a worm wheel mechanism can be also applied.

In the fourth preferred embodiment, since the detecting element 13 is movably provided, the same effect can be obtained as in the first through third preferred embodiments.

What is claimed is:

1. A sensing apparatus, comprising:
   a moving member made of a magnetic material and having concave and convex segments arranged alternately at its periphery;
   a detector including a pair of Hall effect elements for achieving magnetic/electric conversion, said Hall effect elements being arranged to face said concave and convex segments of said moving member;
   a first magnet for providing magnetic field to said pair of Hall effect elements and said moving member, said first magnet having a first surface for said detector being fixed directly thereto;
   a second magnet arranged on a second surface of said first magnet which is opposite to said first surface, said second magnet being rotatably slid in parallel with said first magnet on said second surface within a surface area of said second surface for adjusting magnetic characteristics in said magnetic field;
   a processing circuit for receiving detected signals from said pair of Hall effect elements and generating a processed signal based on the difference between said detected signals and predetermined upper and lower threshold levels; and
   means for adjusting said second magnet in such a way that said processing circuit generate a processed signal at the maximum detectable distance between said moving member and said detector.

2. A sensing apparatus as defined in claim 1, wherein said second magnet has a smaller surface area than that of said first magnet, said second magnet being adjusted to obtain the maximum sensitivity of said sensing apparatus.

3. A sensing apparatus, comprising:
   a moving member made of a magnetic material and having concave and convex segments arranged alternately at its periphery;
   a detector including a pair of Hall effect elements for achieving magnetic/electric conversion, said Hall effect elements being arranged to face said concave and convex segments of said moving member;
   a magnet for providing magnetic field to said pair of Hall effect elements and said moving member, said magnet having a first surface for said detector being fixed directly thereto;
   a yoke arranged on a second surface of said magnet which is opposite to said first surface to form a magnetic circuit with said magnet and said moving member, said yoke being relatively rotatably slid in parallel with said magnet on said second surface and within a surface area of said second surface for adjusting magnetic characteristics in said magnetic field;
   a processing circuit for receiving detected signals from said pair of Hall effect elements and generating a processed signal based on a difference of said detected signals and predetermined upper and lower threshold levels; and means for adjusting said second magnet in such a way that said processing circuit generate a processed signal at the maximum detectable distance between said moving member and said detector.

4. A sensing apparatus as defined in claim 3 wherein:

said magnet is positioned in close proximity to said pair of Hall effect elements;

said yoke has a smaller surface area than that of said magnet, said yoke being movable in parallel with said magnet and relative to said Hall effect elements to adjust said detecting sensitivity of said detecting means.

5. A sensing apparatus as defined in claim 3 further includes:

a spacer for positioning said Hall effect elements and said magnet and said yoke which are movably provided, a holder for movably supporting said spacer from sides of said spacer, an anti-falling member for preventing said spacer from falling.

6. A sensing apparatus as defined in claim 5, wherein said anti-falling member comprises a combination of a concave groove at an outside of said spacer and a convex protrusion at an inside or said holder.

7. A sensing apparatus as defined in claim 5, wherein said anti-falling member comprises a combination of a convex protrusion at an outside of said spacer and a concave groove at an inside of said holder.

8. A sensing apparatus as defined in claim 5, wherein said anti-falling member includes a spacer supporting nail which is provided inside of said holder.

9. A sensing apparatus as defined in claim 5, wherein said spacer includes a groove into which a screwdriver or other tools will be inserted for rotationally adjusting said detecting sensitivity of said detector.

10. A sensing apparatus as defined in claim 1 or 3, wherein said moving member moves in a direction wherein said concave and said convex segments are alternately aligned.

\* \* \* \* \*